United States Patent [19]

Hood

[11] 4,203,376
[45] May 20, 1980

[54] TREATMENT OF WASTE

[75] Inventor: Peter Hood, Weybridge, England

[73] Assignee: Refuse Derived Fuels (London) Limited, London, England

[21] Appl. No.: 943,602

[22] Filed: Sep. 18, 1978

Related U.S. Application Data

[63] Continuation of Ser. No. 752,660, Dec. 21, 1976, abandoned.

[30] Foreign Application Priority Data

Dec. 24, 1976 [GB] United Kingdom ............... 52853/76

[51] Int. Cl.² ............................................. F23G 5/06
[52] U.S. Cl. .................................. 110/346; 44/1 D; 110/246; 431/2
[58] Field of Search ............... 110/235, 246, 259, 222, 110/346; 126/224; 44/1 D; 71/8, 9, 10; 431/2

[56] References Cited

U.S. PATENT DOCUMENTS

| | | | |
|---|---|---|---|
| 3,596,614 | 8/1971 | Smith | 110/216 |
| 3,647,405 | 3/1972 | Smith | 110/222 X |
| 3,861,333 | 1/1975 | Krumm | 110/259 |
| 3,910,775 | 10/1975 | Jackman | 44/1 D |
| 3,960,537 | 6/1976 | Kaelin | 71/9 |

FOREIGN PATENT DOCUMENTS

| | | | |
|---|---|---|---|
| 1018519 | 1/1966 | United Kingdom | 44/1 D |
| 1198958 | 7/1970 | United Kingdom | 44/1 D |

*Primary Examiner*—Edward G. Favors
*Attorney, Agent, or Firm*—Ladas, Parry, Von Gehr, Goldsmith & Deschamps

[57] ABSTRACT

A method for the production of heat comprises composting solid organic waste, preferably in admixture with sewage sludge, and burning the composted waste, for example in a kiln for calcining an inorganic calcinable material. The composted waste preferably has a water content of less than 20% by weight, more preferably from 10 to 20% by weight. The organic waste is preferably composted in a rotating drum preferably for an average residence time of from 12 to 48 hours. The invention also provides a method for producing a fuel by composting a solid organic waste as described above and the fuel produced thereby. The composting is suitably carried out in a rotating drum having festoon chains arranged therein to serve as mixing lifters or flights.

8 Claims, 4 Drawing Figures

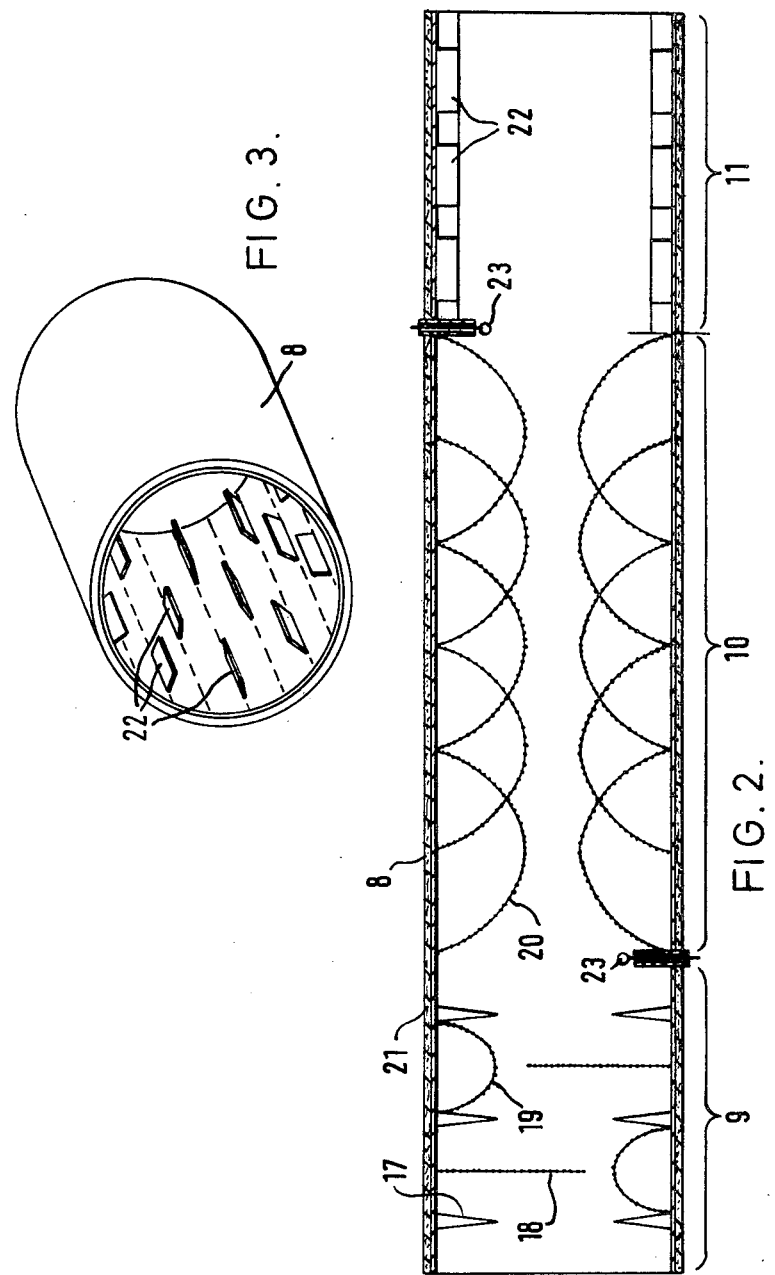

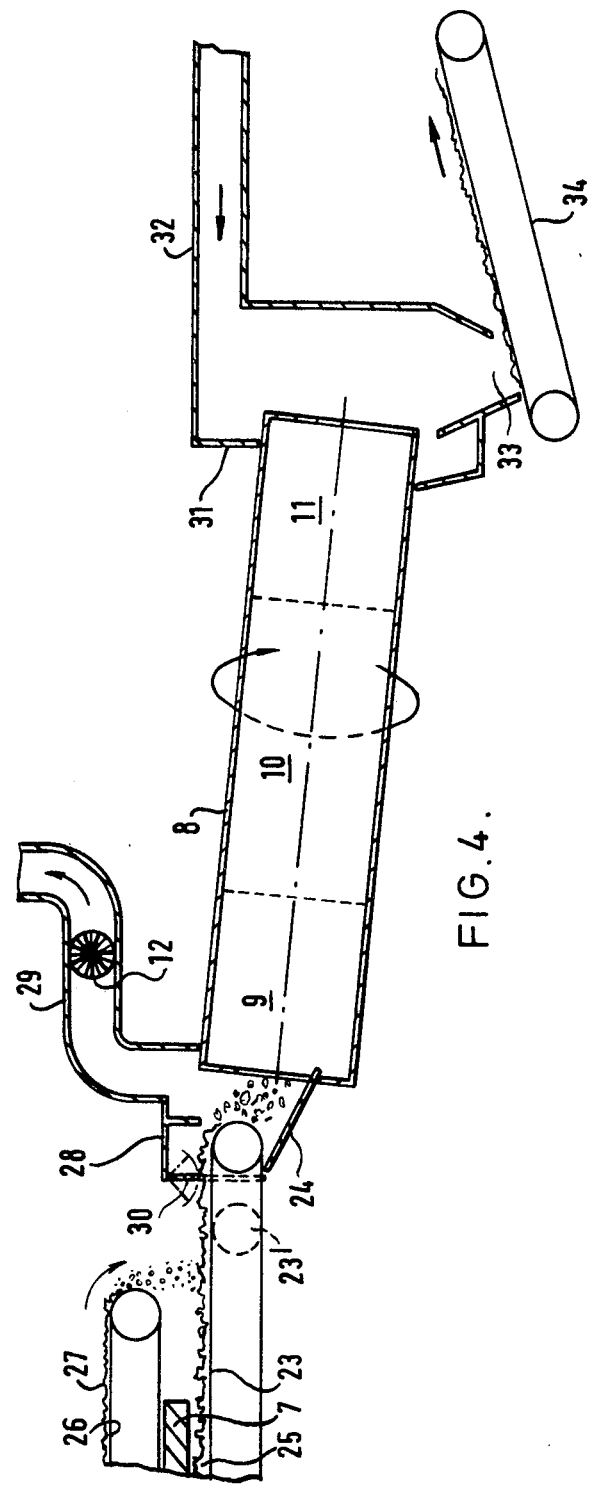

TREATMENT OF WASTE

This is a continuation of co-pending application Ser. No. 752,660, filed Dec. 21, 1976 and now abandoned.

This invention is concerned with improvements in and relating to the treatment of organic material-containing wastes.

The treatment of solid organic material-containing waste (that is dustbin refuse, garbage or trash or the like, hereinafter simply referred to as "solid organic wastes") presents considerable difficulties with regard to its ultimate disposal.

There are, in general, three broadly applicable methods for the disposal of such organic wastes namely:

(1) Tipping or sanitary land fill:
(2) Incineration; or
(3) Composting.

The first method, tipping, has been widely practised in the past and is still widely used but is coming increasingly into disfavour since suitable sites for tipping are becoming increasingly scarce and the environmental disadvantages of this method are becoming increasingly apparent. Conventional incineration of organic wastes requires relatively complex combustion equipment and in view of the fact that the water content of solid organic wastes may be as high as 50% by weight and, accordingly, auxiliary fuels are required in the incineration process thereby adding to its cost and complexity. Further the relatively high ash content of the material may lead to ash disposal problems. Composting of organic wastes offers an apparently more ecological and environmentally satisfactory approach to the treatment of organic wastes since the final product is one which can be used as a soil conditioning agent or, if there is insufficient demand for the material for this use, this material is somewhat less unsightly and objectionable to dump than is the original untreated waste. Even so, composting has not met with too great a success in view of the difficulties of persuading the agricultural industry of the usefulness of the end product (possibly in view of the trace element or inert material, e.g. glass, content of the compost) and in view of the capital cost required for establishing suitable composting plant. Thus, of the three generally available techniques tipping is the most generally operated in view of its generally low costs and also due to the fact that tipping practice has been established over many years.

The present invention is based upon the discovery that the composting process may be so operated as to give a product having a relatively low water content (i.e. less than 20% by weight) and that this product has a sufficient calorific value (e.g. of the order of 3,000 to 5,000 calories per gram on a dry basis) to render it suitable for use as a fuel, that is the moisture content and calorific value of the product are such that the combustion thereof is not merely self-sustaining but can be carried out to produce useful heat energy.

Accordingly, one aspect of the present invention is concerned with a method for the production of heat which comprises composting a solid organic waste to produce a relatively dry product (e.g. having a moisture content of less than 20% by weight) and subsequently burning the composted product.

It will be appreciated that one important step of the method of this invention involves composting an organic waste so as to produce a relatively dry product. The term "composting" as used herein is intended to refer to a process of aerobic fermentation of the organic waste during the course of which carbon dioxide is evolved and the temperature of the fermenting material is raised whereby water vapour is driven off from the fermenting mass so that it is dried or dewatered. Many processes and apparatus have been proposed for the fermentation or composting of organic wastes and, in essence, all of these involve the above indicated steps, namely involve allowing the organic waste to ferment under aerobic conditions. However, such previously proposed processes have generally been carried out so as to produce a product having a relatively high moisture content (e.g. 40% by weight of water or more) and to this end steps have been taken to add sufficient water to the organic waste or to the fermenting mass so as to maintain its moisture level at the desired relatively high level. In accordance with the present invention the moisture content and other process conditions are so controlled that the final product has a relatively low moisture content. Additionally, the fermentation process operated in accordance with the invention may be so operated as to achieve a lower overall fermentation of the material thereby reducing wastage of combustible material. In the past conventional composting processes have been carried out to give a product in which the carbon:nitrogen ratio (i.e. C:N ratio) is as low as possible, e.g. 10:1 as compared with about 35:1 for the starting mixture. In the fermentation according to the invention composting need only be carried out to produce a C:N ratio of, say, 20:1–25:1. In many cases, the previously known fermentation process or apparatus can be modified to produce a relatively dry product, as is required in the case of the present invention, by simple modifications, that is by adjusting the water content of the starting material or the amount of water added at various stages during the process or by varying other process conditions such as the rate of air flow over or through the fermenting material. A particularly preferred fermentation process for use in accordance with the present invention is one which is carried out in a rotary drum, especially one in which the organic waste is fed to one end of a slowly rotating drum and slowly advanced therethrough whilst undergoing fermentation or decomposition, the final product being taken out at the other end of the rotating drum. Air will generally be fed to the drum to assist aerobic fermentation and this may be warm air to assist in water vapour removal.

As in the conventional composting of dustbin or like refuse, the refuse is first treated to remove large, generally incombustible objects, for example by hand sorting, and is then treated, for example on a magnetic separator, to remove metallic objects. Preferably, in accordance with the present invention, the refuse is pulverized after or, preferably, before magnetic separation prior to passing to fermentation. It is also preferred that the pulverized refuse be screened or sieved before being passed to the fermentation drum and before or after magnetic separation (for example to remove material having a size of greater than 2 inches or more). The rejected material from this screening operation, which may comprise larger pieces of combustible material such as paper or cardboard, need not necessarily be rejected but is, preferably, first passed to a shredder to reduce its particle size and then blended in with the composted refuse at a later stage. When screening is carried out before magnetic separation it may be convenient to subject the rejected material to magnetic separation.

The screened refuse is then fed to the fermentation apparatus (hereinafter simply referred to, for the sake of convenience, as a "drum") where fermentation takes place. The moisture content of the screened refuse will commonly be of the order of from 25 to 50%, more commonly from 30 to 40% by weight and whilst this moisture content is generally suitable for composting the refuse it is generally preferred to add additional water to the refuse since this is believed to moisten the drier portions of the refuse and to assist in mechanical breakdown of the refuse in the drum. Thus, it is generally desirable that the initial material fed to the fermentation drum have a water content of from 25 to 50% by weight, preferably from 30 to 45% by weight. The refuse may be moistened by simply adding water or by adding sewage sludge, the addition of which has the advantage of providing additional organic matter to the fermentation mass. In accordance with the present invention it is particularly preferred to moisten the refuse by the addition of sewage sludge, especially a partially dewatered sludge having, for example, a water content of from 60 to 85% by weight. The use of sewage sludge to moisten the refuse not only increases the organic matter content of the fermentation mass, but, also, serves as a very useful method of dewatering sewage sludge. Thus, the disposal of sewage sludge represents a considerable problem and whilst mechanical methods of dewatering sewage sludge (e.g. filter presses) can reduce its water content to, say 75% by weight without too much difficulty, it is very difficult to reduce the water content below this level by mechanical means. By introducing the sewage sludge as moisturising medium for the refuse, the sludge is dewatered during the course of fermentation due to the heat evolved during the fermentation so that the final product, containing sewage sludge solids, has a very much reduced water content as compared with the starting sewage sludge material. The weight ratio of sewage sludge to organic waste fed to the fermentation drum will, of course, depend upon the moisture content of the two materials and the desired water content of their mixture. In practice, however, it has been found that the weight ratio of sewage sludge to organic waste or refuse is suitably from 1:4 to 1:12 by weight, preferably from 1:5 to 1:10 by weight, for an 80% water content sludge. The ratio of sludge to refuse will generally be comparably higher for drier sludges and lower for wetter sludges.

The sewage sludge may be a digested sludge or a crude, undigested sludge. Since the calorific value of the solids contained in undigested sludges is generally markedly higher than for digested sludges it is often useful to employ an undigested sludge in admixture with the solid waste since, other things being equal, the final composted product will then have a higher calorific value.

After passing through the fermentation drum the product may be subjected to a secondary screening operation, for example on a further magnetic separator and/or by an air classifier and is then stored before being passed to suitable combustion apparatus. Due to its low water content the fermented material will no longer ferment and can thus be stored without loss of calorific value and does not evolve unpleasant odours.

It has been noted that during drying of the composted material salts originally contained in the mother liquor (e.g. those contained in the sewage sludge) crystallize out and it is believed that these contribute usefully to the combustibles content of the material.

In order that the invention may be well understood reference will now be made to the accompanying drawings in which:

FIG. 2 is a longitudinal section through a fermenting drum for use in accordance with the process of the invention;

FIG. 3 is a perspective view of the final section of the drum shown in FIG. 2; and FIG. 4 is a schematic sectional view illustrating the feed of materials to and from a fermenting drum.

Figure 1:
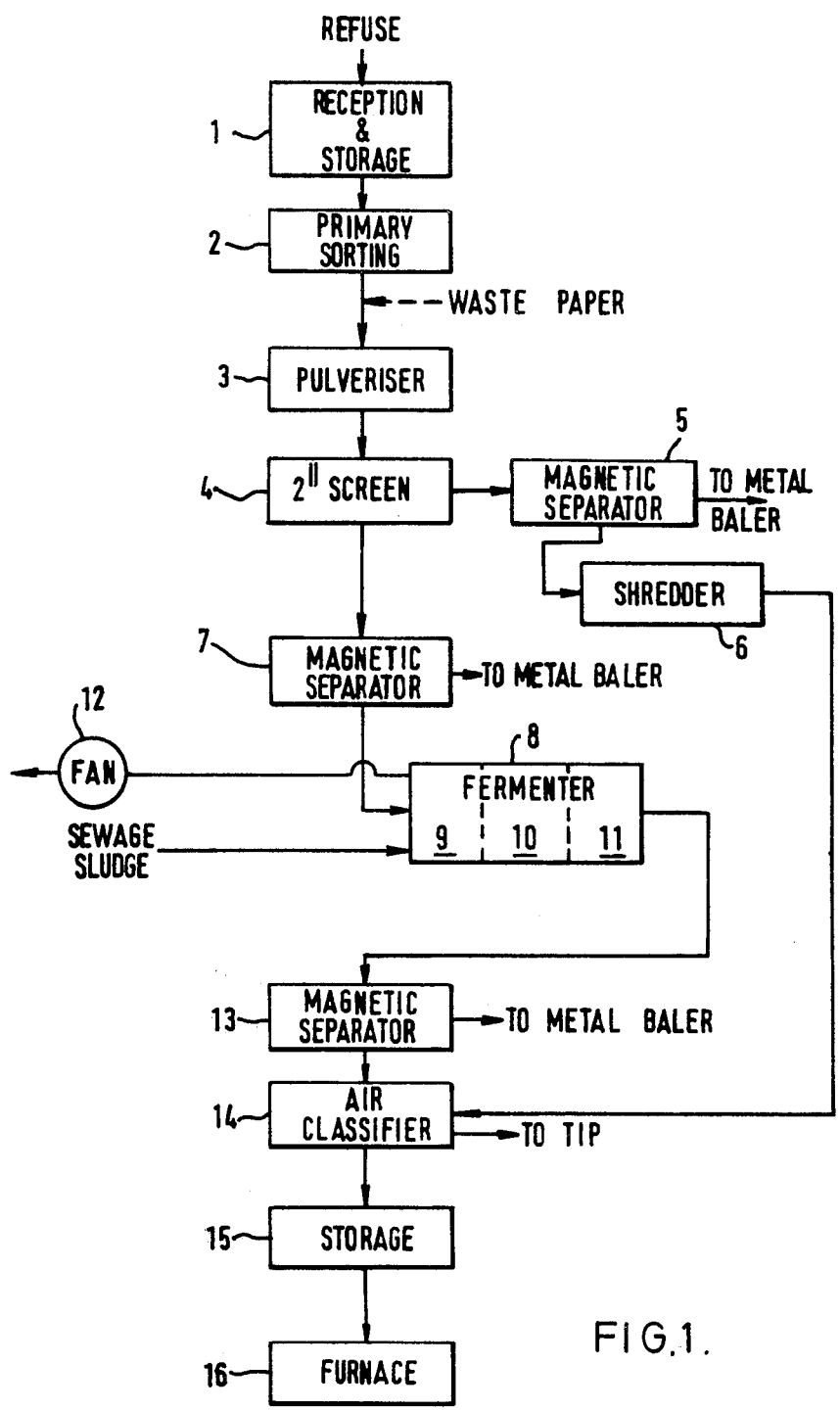
FIG. 1 is a schematic block diagram illustrating one embodiment of the process of the invention.

In accordance with the process illustrated in the drawings, collected refuse is brought into a refuse reception and storage area 1 generally comprising one or more enclosed reception hoppers on concrete bases. Collection and delivery to the storage area is, of course, an intermittent process whereas it is preferred to carry out the fermentation process as a continuous operation, and accordingly, the reception and storage area should be sufficiently large to store a sufficient quantity of refuse for continuous operation of the fermentation apparatus.

Refuse to be fermented is then passed from the storage zone to a primary sorting zone 2, which will generally take the form of a conveyor belt, and in which large or unfermentable objects are removed from the refuse as are those which are unpulverisable or may block the pulverisor. Such objects will commonly be dumped in accordance with usual practice. If desired waste paper may be added to the refuse at this stage (if there is no readily available market for such waste paper) since such material will, clearly, increase the calorific value of the final product (this is not generally carried out in conventional composting processes since such materials add little to the manurial properties of the compost). The material from the primary sorting zone is then passed to a pulveriser 3 in which it is pulverised, that is it is reduced in particle size to say from 2 to 4 inches. Suitable pulverisers are swing hammer pulverisers. Pulverisation prior to introduction into the fermentation drum serves, it is believed, to increase the efficiency of the fermentation in the drum by providing a relatively finely divided material for fermentation therein. The pulverised material from pulveriser 3 is then passed to a screening apparatus 4 (e.g. a vibratory screen) wherefrom oversize rejects (e.g. having a size of 2 inch or more) are passed to a shredder 6 via a magnetic separator 5. The material passing through screen 4 is passed to a magnetic separator 7 where ferromagnetic material is removed and may thence be dumped or, possibly, passed to a metal baler for ultimate sale as scrap. The design and construction of magnetic separators 5 and 7 is well known in the art and requires no further elaboration at this point. The material from separator 7 is then passed to a fermentation drum 8, which is divided into three general sections, a first section 9, a principal fermentation section 10 and a drying section 11 (see FIGS. 2 and 3). Commonly, a moisturising medium (hereinafter referred to as "sewage sludge") will be incorporated with the refuse to moisten it and this sewage sludge is preferably brought into contact with the refuse in the primary section 9 of drum 8 or immediately before it is introduced into section 9 of drum 8. There is thus formed in or fed to primary section 9 of drum 8 an intimate mixture of sewage sludge and screened refuse and this primary section is preferably provided with internally projecting knives or blades 17 which further serve to disintegrate or pulverise the sludge/refuse mixture. Section 9 of drum 8 may also be provided with curtain chains 18, i.e. chains one end of which is attached to the inner periphery of the drum and the other end of which is free, and festoon chains 19, to further enhance the mixing/pulverisation action in the section. In the second section 10 of drum 8 the sludge/refuse mixture undergoes its principal fermentation and in order to achieve efficient aeration of the fermenting mass in this section the interior of the drum is preferably provided with lifters so that upon rotation of the drum the fermenting mass is continuously stirred and/or showered or tumbled. Whilst conventional blade lifters or flights may be used in this section it is preferred to use lifters in the form of festoon chains 20 extending along the side walls of the drum and generally parallel to the longitudinal axis thereof. These chains achieve a very favourable mixing action and also achieve a useful heat transfer action whereby the heat regenerated by the fermenting mass can be used to drive water therefrom. To further achieve aeration of the fermenting mass in section 10 air (possibly warm air) should be introduced into the drum and this is conveniently achieved by drawing air along the length of the drum by means of a variable speed induction fan 12. Where an installation for carrying out the process of the invention is located on the same site as the plant in which the refuse is burnt, warm air may be drawn from the vicinity of the combustion plant; for example in the case where (as described below) the composted refuse is burnt in a calcination kiln warm (or indeed hot) air may be drawn from the vicinity of the hot end of the kiln or may be drawn from the coolers used to cool the calcined product. Exhaust air from the induction fan 12 may be exhausted to atmosphere via a suitable stack, preferably after washing in washers. Alternatively, the exhaust air may be exhausted through a furnace in which the composted refuse is burnt e.g. may be introduced at the hot end of a rotary calcining kiln. In this way unwanted gases evolved during fermentation may be burnt.

During the course of fermentation in drum 8, especially in section 10 thereof, heat is evolved and this serves to dewater the fermentation mixture. If desired, in order to conserve heat within the drum, its walls may be lagged (with lagging 21) to inhibit heat loss since it is desirable that any heat loss should serve to accomplish one of the principal objects of the fermentation reaction, namely the removal of moisture.

The final section 11 of drum 8 is the drying zone of the drum and in this zone the drum is preferably provided with lifters or flights 22 so that the mass therein is subjected to a continual showering action to be brought into contact with air passing through the drum under the action of fan 12. To this end, the lifters in section 11 preferably extend radially inwards to a greater extent than do the lifters in section 10 so that a greater showering action is obtained and may also be constructed as to urge the mass of composted refuse towards the outlet end of drum 9. Section 11 may, if desired, be constructed as a separate drum from the drum constituting zones 9 and 10.

Further, the mixing section 9 of the drum may be replaced by a separate mixer, e.g. a paddle mixer, and in this case it is generally most convenient to feed the sewage sludge to the mixer for mixing with the pulverized refuse from magnetic separator 7. The use of a separate mixer in place of the mixing section 9 of the drum makes it possible to simplify the construction of the drum and reduce its size.

If desired, in order to monitor the fermentation operation, thermocouples 23 are placed in each of zones 9, 10 and 11 or at the boundaries thereof so that the temperature of the material therein can be observed and the process conditions i.e. rate of air flow, rate of rotation of drum, etc., can be adjusted to obtain the optimum conditions, e.g. to maintain the temperature at the end of fermentation zone 10 at between 70° and 80° C., preferably between 73° and 77° C. In this connection it will, of course, be appreciated that drum 8 will be rotated at a relatively low rate, e.g. 0.5–4 r.p.m., preferably about 1 r.p.m. Drum 8 should be of sufficient length to accommodate the mass passing therethrough having regard to the rate at which the material does pass therethrough and, in general, the material will pass through the length of the drum in a period of from 12 to 48 hours. In order to ensure that the material passes through the drum this latter may be inclined at a slight angle to the horizontal e.g. 5°–10°, preferably about 7°.

As indicated above, the fermentation process in accordance with the invention is so operated that the produce emerging from the end of fermentation drum 8 is relatively dry. This is achieved by suitably adjusting the water content of the starting refuse/sludge mixture (but of course, not to a level insufficient for satisfactory fermentation) and arranging for a suitable flow of air through or past the fermenting material. In addition, in the drum described above a definite drying zone, zone 11 is established. In many conventional fermentation drums for composting organic refuse additional moisturising liquid (i.e. water or sewage sludge) is introduced into the fermenting mass as it passes along the length of the drum. When operating in accordance with the invention this further addition need not take place or may take place only to a limited degree. In any event it is most desirable that no water is introduced into the final section of the drum which is a drying zone, and the lifters or flights thereof are designed to give increased aeration (and hence drying) as compared with the preceding, principal fermentation, zone of the drum. By these means the moisture content of the composted material emerging from the end of the drum may be reduced to the required levels.

In this regard it may be noted that it is generally preferred that the water content of the final composted product be from 20 to 10% by weight, more preferably from 20 to 15% by weight.

Thus if it is attempted to obtain moisture levels below about 10% by weight it is found that the temperature required are such as to severely inhibit fermentation and that the calorific value of the final product is not usefully enhanced.

The dried product from the drum 11 is then conveniently subjected to a secondary screening operation on a second magnetic separator 12 (whence separated material may be dumped or passed to a metal baler for sale as scrap) and an air classifier 13 to which material rejected from screen 4 is added after shredding in shredder 6, the rejected material from air classifier 12 (such as ashes, non-ferrous metal, glass and other particulate incombustible materials) being dumped in a conventional manner. The product from the secondary screening operation is then suitable for use as a fuel and should be stored in the hopper 14 before being passed to final combustion in furnace 15. Before combustion the material may be further ground, for example in an attritor, and may then be burnt in any suitable heat energy raising furnace. This furnace, for example, may be a steam raising or water heating furnace or may be a furnace used in some other industrial process, for example a calcining operation. The product may be used as the sole fuel of the furnace or may be used as an auxiliary fuel together with conventional gases, liquid or solid fuels but, in any event, will have a sufficiently high calorific value to render its combustion capable of evolving useful heat.

The following Table illustrates a typical mass balance for the operation of the process as shown in the drawings when treating a typical domestic refuse.

transferred to magnetic separator 13 and belt conveyor 33.

The air introduced into duct 22 may be hot air taken from a hot area of the plant as described above and the air discharge via duct 29 may be discharged, for example, to a stack or a kiln as described above.

As indicated above the composted material may serve as a fuel in a calcining operation. Thus one preferred embodiment of the invention is concerned with a process wherein the composted material is burnt as an auxiliary fuel in the calcination of a calcinable inorganic material.

The term "calcinable inorganic material" as used

| | INPUT | | | OUTPUT | | |
|---|---|---|---|---|---|---|
| UNIT | Amount (tons/day) | Moisture content (% by wt.) | From | Amount (tons/day) | Moisture content (% by wt.) | To |
| PULVERIZER 3 | 240 | 30 | Primary sorting 2 | 240 | 30 | Screen 4 |
| SCREEN 4 | 240 | 30 | Pulverizer 3 | 82 | 20 | Magnetic Separator 5 |
| | | | | 158 | 36 | Magnetic Separator 7 |
| MAGNETIC SEPARATOR 5 | 82 | 20 | Screen 4 | 80 | 20 | Shredder 6 |
| | | | | 2 | — | Metal Baler |
| SHREDDER 6 | 80 | 20 | Magnetic Separator 5 | 80 | 20 | Air Classifier 14 |
| MAGNETIC SEPARATOR 7 | 158 | 36 | Screen | 155 | 36 | Drum 8 |
| | | | | 3 | — | Metal Baler |
| DRUM 8 | 158 | 36 | Magnetic Separator 7 | 120 | 15 | Magnetic Separator 13 |
| | 16 | 80 | Dewatered Sewage Sludge | | | |
| MAGNETIC SEPARATOR 13 | 120 | 15 | Drum 8 | 110 | 16 | Air Classifier 14 |
| | | | | 10 | — | Metal Baler |
| AIR CLASSIFIER 14 | 110 | 16 | Magnetic Separator 13 | 160 | 17 | Product |
| | 80 | 20 | Shredder 6 | 25 | — | To tip |

FIG. 4 of the drawings diagrammatically illustrates a preferred arrangement for feeding materials to and from fermentation drum 8. Thus pulverise and screened refuse 25 is fed via belt conveyor 23 under a magetic separator 7 to a chute 25 whence it passes to mixing section 9 of drum 8. The interior of drum 8 will be provided with knives, chains and lifters as shown in FIG. 2 but these are omitted (for clarity) from FIG. 4. Drum 8 is mounted upon suitable bearings (not shown) and is further provided with means (not shown) for rotating it, e.g. at a rate of from 1 to 4 r.p.m. Dewatered sewage sludge 27 is fed via belt conveyor 26 and is brought into contact with pulverised refuse 25 at the end of conveyor 23 and is fed with the refuse to drum 8. The input end of drum 8 is surrounded by a casing 28 carrying said duct 29 in which is mounted variable speed fan 12. Casing 28, in which chute 24 forms the bottom wall surrounds the end of drum 8 so that fan 12 may draw air through drum 8. In order to minimise the ingress of air into casing 28 a flexible (e.g. rubber) air seal flap 30 is provided adjacent the upper links of conveyor 23. Conveyor 23 may be set to the piston shown at 23' and the orifice in casing 28 may be retracted to the piston shown at 23' and the orifice in casing 28 may be provided with a suitable sealing slide for closing the orifice if it is desired to operate the apparatus with intermittent feed of refuse and/or sludge.

The output end of the drum is surrounded, again in a generally airtight manner, by casing 31 which connects with an air inlet duct 32 and has a product discharge orifice 32 wherein product energy from drum 11 is herein is intended to refer to any inorganic material which may be calcined in a kiln to produce a useful calcined product. Examples of such calcinable inorganic materials include chalk and limestone (calcium carbonate) which may be calcined to give lime; bauxitic clays which may be calcined to give alumina; dolomite which may be calcined to give magnesia; and mixtures of silicaceous materials (especially clays) and chalk or limestone which may be calcined to give cement such as Portland Cement.

It has already been proposed to use pulverised dustbin or like refuse as an auxiliary fuel in the production of cement by calcination of a clay/chalk or limestone mixture which process serves not only as a method for the removal or disposal of dustbin refuse but also gives rise to savings in respect of the conventional fuels used in the calcination process. However, in view of its relatively high water content, which may vary from 30 to 50% by weight, pulverised domestic refuse is often a difficult material to handle in that it may give rise to clogging problems on the handling machinery and it also has the disadvantage that it is a rather unpleasant material to handle. Further such material will generally have a vaariable ash content and accordingly will give rise to problems of process control in that the composition of the total cement-firing material fed to the process may vary to such an extent that an inferior product may be produced. In contradistinction the relatively dry composted product burnt in accordance with the present invention is much more readily handled. The problem of quality control of the fuel may be calcined, in accordance with the invention, by air classification to reduce its ash content, thereby reducing the variable factor.

In order to further acclerate the removal of moisture from the composting material wherein the composted product, is to be employed in a calcining operation, the composting apparatus may conveniently be sited in a high temperature zone of the calcining plant, for example in the vicinity of the coolers where ambient temperatures may be of the order of 35° to 65° C. By siting the composting plant in this area, heat losses from the apparatus are minimised and any air passing through the drum is at a relatively high temperature whereby the removal of water vapour is facilitated. Alternatively, the air supplied to the fermentation drum may be drawn from the vicinity of the hot end of the kiln or may be drawn from the exhaust gases of grate-type clinker coolers with the attendant advantage that any entrained fine clinker may be entrained with the composted product and thence recycled to the kiln.

The fuel product produced in accordance with the invention is in many ways comparable with low grade solid fuels such as low grade coal or lignite. Thus, it may have a calorific value of from 3000 to 5,000 cal/gm. The composted product from the fermenter will be a relatively high ash fuel (e.g. containing from 20 to 30% by weight of ash on a dry basis) especially in view of the fact that it is prepared from a starting material already containing incombustible materials such as ashes, small metallic particles or small pieces of glass. This ash content may be reduced by an air classification process. In certain operations (for example the production of cement) the ash itself may form a valuable contribution to the final end product of the operation.

However, removal of at least a part of the ash correspondingly increases the calorific value of the product and the costs of so doing are often acceptable and it may be desirable to give a generally constant ash content to the final product.

The calorific value of the composted material produced in accordance with the present application may be enhanced by incorporating hydrocarbonaceous oils, such as waste hydrocarbonaceous oils, crude oils or partially refined oils, e.g. in an amount of up to 15% by weight. This may be achieved simply by mixing the composted product with the hydrocarbonaceous oils but it is preferably achieved by mixing the hydrocarbon oil with the material to be treated, that is the mixture or organic waste material and water, partially dewatered sewage sludge or raw sewage sludge. In this way the hydrocarbonaceous oil becomes absorbed by the fibrous constituents of the waste organic material and when these are broken down during the composting process the fragments thereof containing absorbed oil become well dispersed within the composted product giving a readily handleable product. By incorporating hydrocarbonaceous oils in the composted product of the invention in this manner not only is the calorific value of the product enhanced but, in addition, there is provided a convenient method for the utilisation of hydrocarbonaceous oils, e.g. waste hydrocarbonaceous oils, the disposal of which has given rise to problems in the past.

Further, the composted product may be mixed with solid fuels to give a product having a higher calorific value. Thus, the product may be mixed with washed coal smalls (e.g. having a particle size of one inch or less) to produce a product having a reduced per therm as compared with the coal itself. This is particularly applicable to coals, such as wet coals, or low volatile coals, which have previously often been considered difficult to use. The ratio of composted product to solid fuel may vary widely. In order that the invention may be well understood the following Examples are given by way of illustration only.

EXAMPLE 1

Two samples (each of 400 kg) were taken from the pulverizer of a refuse treatment plant. These samples had the following basic characteristics shown in Table 1.

|  | Sample A | Sample B |
| --- | --- | --- |
| Moisture content (% by weight) as received | 24.8 | 27.6 |
| Calorific value (on a dry basis) | 2900 cal/gm | 3100 cal/gm |
| Ash content: (on a dry basis - % by weight) | 31.4 | 32.4 |

The composition of each of the samples was investigated to give the results shown in Table 2.

TABLE 2

| Component | Sample A % by wt. | Sample A % by vol. | Sample B % by wt. | Sample B % by vol. |
| --- | --- | --- | --- | --- |
| Dust and ashes | 18.2 | 6.4 | 17.5 | 6.0 |
| Paper and Cardboard | 35.8 | 69.9 | 36.4 | 71.1 |
| Plastics | 4.1 | 6.2 | 3.7 | 5.8 |
| Metal | 8.2 | 6.0 | 8.4 | 6.0 |
| Glass | 10.0 | 3.2 | 10.5 | 3.3 |
| Organic matter (vegetables etc.) | 18.4 | 5.4 | 19.0 | 5.6 |
| Textiles | 2.4 | 1.5 | 2.0 | 1.2 |
| Unclassified | 2.2 | 1.4 | 2.5 | 1.0 |

The two samples of pulverized refuse were thoroughly mixed together and four 25 kg samples (sample A) of the mixture were taken. Further four 25 kg samples (sample B) taken of the mixture from which metal and glass had been removed by hand mixing.

Two samples of digested sewage sludge and two samples of raw undigested sewage sludge were analysed to give the results shown in Table 3.

TABLE 3

|  | Digested sludge Sample A | Digested sludge Sample B | Undigested sludge Sample A | Undigested sludge Sample B |
| --- | --- | --- | --- | --- |
| Moisture content (% by weight) | 68.0 | 72.5 | 76.8 | 81.4 |
| Ash (% by weight on a dry basis) | 29.4 | 27.6 | 25.6 | 26.2 |
| Calorific value (on a dry basis, cal/gm) | 4850 | 4950 | 6700 | 7100 |

The two samples of the digested sludge were thoroughly mixed together as were the two samples of the undigested sludge. Then 5 kg and 2.5 kg samples of each were thoroughly mixed with refuse samples A and B respectively to give the following mixtures.

TABLE 4

| Mixture | Refuse | Sludge Digested | Sludge Undigested |
| --- | --- | --- | --- |
| 1 | A (25 kg) | 5 kg | — |

TABLE 4-continued

| Mixture | Refuse | Sludge Digested | Sludge Undigested |
|---|---|---|---|
| 2 | A (25 kg) | 2.5 kg | — |
| 3 | B (25 kg) | 5 kg | — |
| 4 | B (25 kg) | 2.5 kg | — |
| 5 | A (25 kg) | — | 5 kg |
| 6 | A (25 kg) | — | 2.5 kg |
| 7 | B (25 kg) | — | 5 kg |
| 8 | B (25 kg) | — | 2.5 kg |

Each of the mixtures was then composted in a rotary drum for a period of 48 hours and the water content, ash content and calorific value of each of the composted products were determined to give the results shown in Table 5.

TABLE 5

| Compost for mixture | Water content of compost (% by weight) | Ash content of compost (% by weight on a dry basis) | Calorific value of compost (cal/gm, on a dry basis) |
|---|---|---|---|
| 1 | 8.4 | 31.0 | 4050 |
| 2 | 9.2 | 30.5 | 3800 |
| 3 | 14.6 | 11.0 | 4600 |
| 4 | 11.4 | 11.4 | 4750 |
| 5 | 10.2 | 28.5 | 4300 |
| 6 | 10.4 | 28.0 | 4300 |
| 7 | 12.5 | 9.0 | 4950 |
| 8 | 14.8 | 9.5 | 5100 |

EXAMPLE 2

1100 Tons of domestic refuse were having an average water content of 30% by weight were screened to remove 300 tons of rejects have a size greater than 3 inches (average waste content 15% by weight). The remaining 800 tons of refuse were fed to a "dano" type rotary composting plant over a period of 16 hours together with 110 tons of a dewatered digested sewage sludge having a water content of 80% by weight. The residence time of the material in the fermentation drum was 48 hours and there were obtained 600 tons of a composted product having a moisture content of 17.5% by weight, an ash content of 24.7% by weight and calorific value (on a dry basis) of 3610 cals/gm.

This product was an apparently dry product and could be burnt as an auxiliary fuel in a rotary cement kiln.

I claim:

1. A method for the production of heat which comprises composting solid organic waste by tumbling the waste for an average time of from 12 to 48 hours and subsequently burning the composted waste.

2. A method as claimed in claim 1 in which the composted waste has a water content of less than 20% by weight.

3. A method as claimed in claim 1 in which the composted waste has a water content of from 10 to 20% by weight.

4. A method as claimed in claim 1 in which the composted waste has a water content of from 15 to 20% by weight.

5. A method as claimed in claim 1 in which organic waste is first screened before composting.

6. A method as claimed in claim 1 in which the organic waste is pulverized before being composted.

7. A method as claimed in claim 1 in which the organic waste is composted in admixture with sewage sludge.

8. A method as claimed in claim 7 in which the sewage sluge is an undigested sewage sludge.

* * * * *